Jan. 12, 1926.
W. N. BORDER
1,569,169
SHOCK ABSORBER
Filed Dec. 24, 1924
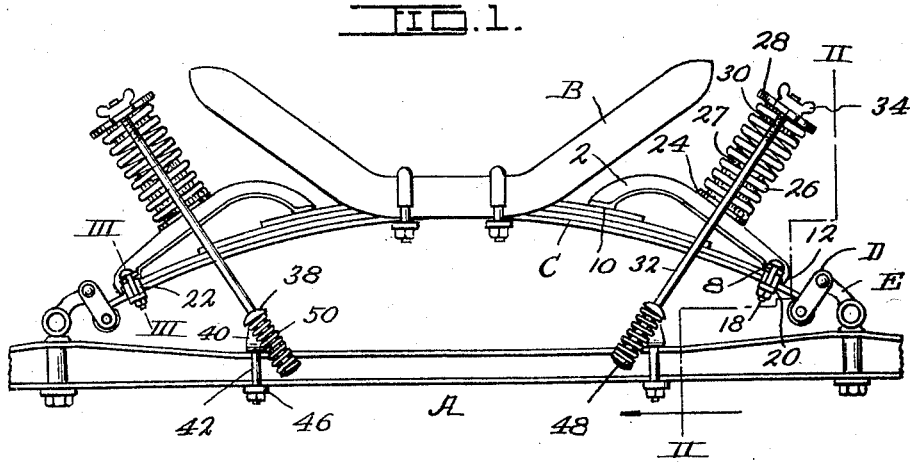
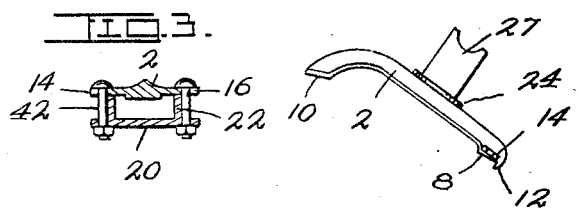
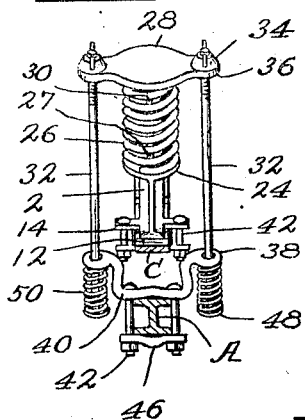
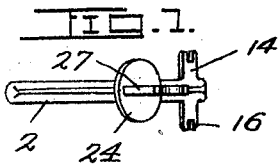
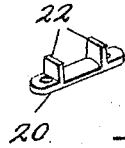
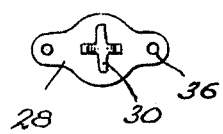
Inventor:
William N. Border,
By F. G. Fischer,
Attorney.
Witness:
Fred C. Fischer.

Patented Jan. 12, 1926.

1,569,169

UNITED STATES PATENT OFFICE.

WILLIAM N. BORDER, OF KANSAS CITY, MISSOURI.

SHOCK ABSORBER.

Application filed December 24, 1924. Serial No. 757,904.

*To all whom it may concern:*

Be it known that I, WILLIAM N. BORDER, a citizen of the United States, residing at Kansas City, in the county of Jackson and State of Missouri, have invented certain new and useful Improvements in Shock Absorbers, of which the following is a specification.

My invention relates to shock absorbers for motor vehicles and one object is to provide a device of this character which will cooperate with the springs of the vehicle in absorbing the shocks and vibrations imposed on said springs.

A further object is to provide a device which will modify the rebound of the vehicle springs and utilize the force thereof in holding the vehicle wheels to the road, to the end that said wheels will not be apt to skid and thereby damage the tires.

Another object is to provide a shock absorber, which with slight modifications, can be readily installed on different kinds of motor vehicle springs and which may be readily adjusted to accommodate different loads.

In the drawings, I have shown my shock absorbers applied to a semi-elliptical spring of the Ford type, but the essential principles of my invention are capable of adaptations to other types of springs.

In order that the invention may be fully understood, reference will now be had to the accompanying drawing, in which:

Fig. 1 is an elevation showing the adaptation of the invention to a front spring of the Ford type.

Fig. 2 is an irregular vertical section on line II—II of Fig. 1.

Fig. 3 is a vertical cross section on line III—III of Fig. 1, with the vehicle spring removed.

Fig. 4 is a detail perspective view of a clip employed in securing the device to the vehicle spring.

Fig. 5 is an inverted plan view of a cap employed in carrying out the invention.

Fig. 6 is a detail side elevation of a lever forming an important feature of the invention.

Fig. 7 is a plan view of the lever.

Fig. 8 is an elevation of a yoke employed in securing the device to an unsprung portion of the vehicle.

Referring now in detail to the different parts, A designates the front axle, B the front portion of the frame, and C the front spring which is connected to the axle A through the intermediacy of the links D and the hangers E, all of which may be of usual construction.

Referring now more particularly to the parts constituting the invention, 2 designates a lever which is more or less of arched formation and provided at its ends with flat bearing surfaces, or seats, 8 and 10, which rest upon the adjacent portion of the spring C. The lower end of the lever 2 has a depending lip 12 and laterally extending lugs 14 with recesses 16 for the reception of bolts 18, which coact with a clip 20 in securing the lower end of said lever 2 in position upon the spring C, the lip 12 engaging the adjacent end of one of the spring leaves to prevent the lever 2 from creeping upwardly thereon.

As it is not desirable to clamp the lower end of the lever 2 upon the spring C sufficiently tight to prevent free movement of the spring leaves with respect to each other, the clip 20 is provided with a pair of spacing elements 22 which extend upwardly at opposite sides of the spring C and engage the bearing surface 8 at the lower end of the lever 2, the upper bearing surface 10 having a slidable engagement with the upper spring leaf, so that the spring C may flex and reflex when the vehicle is running on a road with an uneven surface.

The lever 2 is provided intermediate its ends with a spring seat 24 for the reception of the lower end of a main coil spring 26, which is held in place by a retainer 27 projecting upwardly from said seat 24 and into the lower portion of the spring 26.

The upper end of the main spring 26 is seated against the underside of a cap 28, which has a retainer 30 extending into the upper end of said main spring to prevent accidental displacement of the same. The cap 28 is caused to compress the main spring 26 by a pair of tie-rods 32 and thumb nuts 34, which latter are threaded upon the former. The upper threaded ends of the tie-rods 32 extend through eyes 36 on the cap 28 while their lower ends extend through eyes 38 in a yoke 40, clamped to an unsprung portion of the vehicle, as, for instance, the axle A, by means of bolts 42 and clips 46.

The tie-rods 32 extend a suitable distance below the yoke 40 and terminate in heads 48, between which and the eyes 38 auxiliary springs 50, embracing said tie-rods 32, are held.

In practice a pair of the shock absorbers are applied to the spring C, with the lower ends of the tie-rods 32 converging towards a common point, Fig. 1, which arrangement enables the shock absorbers to act efficiently on shocks coming from any direction and also practically eliminate lateral sway, or tendency of the frame B to rock independently of the axle A. The thumb nuts 34 are screwed down to tension the main and auxiliary springs 26 and 50, respectively, according to the load to be carried by the vehicle. When the vehicle is running the auxiliary springs 50 absorb the minor shocks, while the greater vibrations are absorbed by the main springs 26 in conjunction with the auxiliary springs 50 and the vehicle spring C. It will be understood that rebound of the vehicle spring C is largely absorbed and neutralized by the main springs 26 pressing downwardly on the intermediate portion of the levers 2, which latter being fulcrumed at their seats 8, are caused by said main springs 26 to exert considerable downward pressure upon the vehicle spring C at the seats 10 and thus prevent violent rebound of said spring C. The downward pressure of the levers 2 upon the vehicle spring C also causes the same, through its connections with the axle A, to hold the vehicle wheels upon the ground, thereby insuring better traction and less liability of the wheels to skid.

From the foregoing description it is apparent that I have produced a shock absorber whereby smooth and comfortable riding is assured, and while I have shown and described the preferred construction, combination, and arrangement of parts, I reserve the right to make such changes as properly fall within the spirit and scope of the invention as claimed.

Having thus described my invention, what I claim and desire to secure by Letters Patent, is:

1. A shock absorber consisting of a lever seated at its ends upon one of the vehicle springs, a main spring mounted upon the intermediate portion of said lever, a cap mounted upon said main spring, a pair of rods extending freely through eyes in said cap, a yoke secured to an unsprung portion of the vehicle and having eyes through which said rods freely extend, and auxiliary springs interposed between said yoke and heads on said rods.

2. A shock absorber for motor vehicles consisting of a pair of levers mounted upon one of the vehicle springs adjacent to the ends thereof, a main coil spring mounted upon each lever, a cap mounted upon each main spring, a pair of rods extending freely through eyes in each cap the two pairs converging towards each other at their lower ends, a pair of yokes secured to the vehicle axle and having eyes through which the rods freely extend, auxiliary springs mounted upon the rods and interposed between said yokes and heads on said rods, and means threaded on the rods and bearing against the caps to tension the main and auxiliary springs.

3. A shock absorber for motor vehicles consisting of a lever mounted upon one of the vehicle springs, a main spring mounted upon the intermediate portion of said lever, a member secured to an unsprung portion of the vehicle, a pair of rods extending freely through said member, auxiliary springs loosely embracing the lower portions of said rods and interposed between the enlarged lower ends thereof and said member, and means operably connecting the upper ends of said rods and the main spring.

In testimony whereof I affix my signature.

WILLIAM N. BORDER.